(12) United States Patent
Katzen et al.

(10) Patent No.: US 7,632,901 B2
(45) Date of Patent: *Dec. 15, 2009

(54) CATALYST SYSTEM AND PROCESS

(75) Inventors: Stanley J. Katzen, Baton Rouge, LA (US); Zerong Lin, Kingwood, TX (US); Anthony N. Speca, Kingwood, TX (US); James A. Kendrick, Baton Rouge, LA (US); Scott T. Roger, Baton Rouge, LA (US)

(73) Assignee: ExxonMobil Chemical Patents Inc., Houston, TX (US)

(*) Notice: Subject to any disclaimer, the term of this patent is extended or adjusted under 35 U.S.C. 154(b) by 200 days.

This patent is subject to a terminal disclaimer.

(21) Appl. No.: 10/456,604

(22) Filed: Jun. 6, 2003

(65) Prior Publication Data

US 2003/0232715 A1 Dec. 18, 2003

Related U.S. Application Data

(60) Provisional application No. 60/387,006, filed on Jun. 6, 2002.

(51) Int. Cl.
C08F 4/52 (2006.01)
C08F 4/58 (2006.01)

(52) U.S. Cl. .................. 526/129; 526/96; 526/105; 526/106; 526/352

(58) Field of Classification Search ............. 502/103, 502/107; 526/129, 96, 105, 106, 352
See application file for complete search history.

(56) References Cited

U.S. PATENT DOCUMENTS

| | | | | |
|---|---|---|---|---|
| 2,825,721 | A | 3/1958 | Hogan et al. | 260/88.1 |
| 3,887,494 | A | 6/1975 | Dietz | 252/452 |
| 4,182,810 | A | 1/1980 | Willcox | |
| 4,877,763 | A | 10/1989 | McDaniel et al. | 502/117 |
| 5,096,868 | A | 3/1992 | Hsieh et al. | 502/107 |
| 5,169,815 | A * | 12/1992 | Dawkins | 502/152 |
| 5,274,056 | A | 12/1993 | McDaniel et al. | |
| 5,599,887 | A * | 2/1997 | Badley et al. | 526/105 |
| 6,174,981 | B1 | 1/2001 | Coutant et al. | 526/348.2 |
| 6,194,520 | B1 * | 2/2001 | Cheruvu et al. | 525/240 |
| 6,201,077 | B1 * | 3/2001 | Bergmeister et al. | 526/104 |
| 6,242,543 | B1 | 6/2001 | Follestad et al. | 526/118 |
| 6,316,553 | B1 * | 11/2001 | McDaniel et al. | 526/64 |
| 6,399,722 | B1 * | 6/2002 | Szul et al. | 526/113 |
| 6,489,428 | B1 * | 12/2002 | Debras et al. | 526/352 |
| 6,524,988 | B2 * | 2/2003 | Speca | 502/152 |
| 6,586,544 | B2 * | 7/2003 | Szul et al. | 526/160 |
| 6,642,324 | B2 * | 11/2003 | Bergmeister et al. | 526/129 |
| 6,646,069 | B2 * | 11/2003 | Monoi et al. | 526/105 |
| 6,657,024 | B1 * | 12/2003 | Blackmon et al. | 526/128 |
| 6,734,131 | B2 * | 5/2004 | Shih et al. | 502/80 |
| 6,809,057 | B2 * | 10/2004 | Lin et al. | 502/152 |
| 6,825,292 | B2 * | 11/2004 | Reid | 526/89 |
| 6,831,143 | B2 * | 12/2004 | Britovsek et al. | 526/352 |
| 6,833,416 | B2 * | 12/2004 | Kinnan et al. | 526/82 |
| 6,846,770 | B2 * | 1/2005 | Speca | 502/104 |
| 6,846,886 | B2 * | 1/2005 | Mawson et al. | 526/115 |
| 6,885,416 | B2 | 4/2005 | Luo et al. | |
| 7,223,823 | B2 * | 5/2007 | Lin | 526/106 |
| 2003/0232715 | A1 | 12/2003 | Katzen et al. | 502/107 |

FOREIGN PATENT DOCUMENTS

| | | | |
|---|---|---|---|
| CA | 969525 | * | 6/1975 |
| DE | 26 22 755 A1 | | 12/1977 |
| EP | 0 279 890 A2 | | 8/1988 |
| EP | 1 172 381 A1 | | 1/2002 |
| GB | 1271445 | | 4/1972 |
| GB | 1 405 255 | * | 9/1975 |
| GB | 1405255 | | 10/1975 |
| GB | 1433052 | | 4/1976 |
| GB | 2 073 761 | * | 10/1981 |
| GB | 2073761 | | 10/1981 |
| WO | WO 94/21962 | | 9/1994 |
| WO | WO98/057998 | * | 12/1998 |
| WO | WO 01/32307 A1 | | 5/2001 |

OTHER PUBLICATIONS

Xia et al. "Unique polymerization kinetics obtained from simultaneous interaction of Phillips Cr(VI)Ox/SiO2 catalyst with Al-alkyl cocatalyst and ethylene monomer", Journal of Molecular Catalysis A:Chemical 256 (2006) 301-308. no month.*

Woo et al. "Ethylene Polymerization with Phillips Catalyst Co-Catalyzed with SI(i-Bu)3", Journal of Catalysis, 123, 215-227, (1990), no month.*

Marsden, C. E., "*Plastics, Rubber and Composites Processing and Applications*," vol. 21, pp. 193-200, 1994.

* cited by examiner

*Primary Examiner*—Elizabeth D Wood

(57) ABSTRACT

Methods of making supported chromium catalyst systems and processes of polymerizing ethylene using the supported chromium catalyst systems are disclosed. A method of forming a catalyst system in a polymerization reactor includes contacting a supported chromium catalyst and a metal alkyl cocatalyst by cofeeding the catalyst and cocatalyst to the reactor or feeding the catalyst and cocatalyst separately to the reactor, to form a catalyst system. The catalyst and cocatalyst are not pre-contacted prior to the feeding or cofeeding step. The catalyst system can be contacted with ethylene and optional alpha-olefin comonomer to form polyethylene.

16 Claims, No Drawings ical articles include, for example, pipes and drums.

CATALYST SYSTEM AND PROCESS

CROSS-REFERENCE TO RELATED APPLICATIONS

This application claims the benefit of U.S. Provisional Application No. 60/387,006, filed Jun. 6, 2002, the disclosure of which is incorporated herein by reference in its entirety.

FIELD OF THE INVENTION

The invention is generally directed to methods making supported chromium catalyst systems and methods of polymerizing ethylene using such catalyst systems. In particular, the invention provides methods of forming a supported chromium catalyst-metal alkyl cocatalyst system in a polymerization reactor, and methods of polymerizing ethylene with or without addition of comonomer using the catalyst system.

BACKGROUND

Chromium catalysts, sometimes termed Phillips catalysts, are well known catalysts for olefin polymerization. In these catalysts, a chromium compound, such as chromium oxide, is supported on a support of one or more inorganic oxides such as silica, alumina, zirconia or thoria, and activated by heating in a non-reducing atmosphere. U.S. Pat. No. 2,825,721 describes chromium catalysts and methods of making the catalysts. It is also known to increase polymer melt index by using a silica-titania support as disclosed, for example, in U.S. Pat. No. 3,887,494.

European patent application EP 1 172 381 A1 discloses a method for producing ethylene polymers reputedly having improved environmental stress crack resistance (ESCR) using a trialkylaluminum compound-carried chromium catalyst. The activated chromium compound on an inorganic support is treated with a trialkylaluminum compound in an inert hydrocarbon solvent and the solvent removed to form a trialkylaluminum-carried chromium catalyst. EP 1 172 381 A1 discloses that the time of contact with the solvent must be minimized to avoid over-reduction and associated degradation of polymer properties. The reference further teaches that for ESCR and impact resistance it is essential to use hydrogen in a carefully controlled hydrogen-ethylene ratio. The need for careful control of contact time, hydrogen concentration, and amount of trialkylaluminum used in the catalyst synthesis in order to achieve desired polymer properties limits the usefulness of such methods.

U.S. Pat. No. 6,174,981 discloses a process of polymerizing ethylene and at least one $C_3$ to $C_8$ mono-olefin in the presence of a catalyst including chromium supported on a silica-titania support and a trialkylboron compound. The process, however, produces resins that generally have density and HLMI (high load melt index, $I_{21.6}$) values lower than would be desirable for environmentally demanding applications such as for pipe or drum resins.

Other relevant references include EP 0279890; WO 01 32307; DE 2622755; and U.S. Pat. No. 4,877,763.

SUMMARY OF THE INVENTION

In one embodiment, the invention provides a method of forming a catalyst system in a polymerization reactor, by providing a supported chromium catalyst and a trialkylaluminum cocatalyst; and contacting the catalyst and cocatalyst to form a catalyst system. The catalyst and cocatalyst are contacted by cofeeding the catalyst and cocatalyst to the reactor, or feeding the catalyst and cocatalyst separately to the reactor. The catalyst and cocatalyst are not contacted prior to the step of feeding or cofeeding.

In another embodiment, the invention provides a method of forming a catalyst system in a polymerization reactor, by providing a supported chromium catalyst activated at a temperature of greater than 600° C. and a Group 13 metal alkyl cocatalyst; and contacting the catalyst and cocatalyst to form a catalyst system. The catalyst and cocatalyst are contacted by cofeeding the catalyst and cocatalyst to the reactor, or feeding the catalyst and cocatalyst separately to the reactor. The catalyst and cocatalyst are not contacted prior to the step of feeding or cofeeding.

In another embodiment, the invention provides catalyst systems produced by the inventive processes, polyethylene resins produced using these catalyst systems, and articles formed of or including the polyethylene resins. Typical articles include, for example, pipes and drums.

In another embodiment, the invention provides a process of polymerizing ethylene in a reactor, by providing a supported chromium catalyst; providing a cocatalyst selected from metal alkyls of group 13 metals, and mixtures thereof; contacting the catalyst and cocatalyst by cofeeding the catalyst and cocatalyst to the reactor or feeding the catalyst and cocatalyst separately to the reactor, to form a catalyst system; and contacting the catalyst system, under polymerization conditions, with ethylene to form polyethylene. The catalyst and cocatalyst are not contacted prior to the step of feeding or cofeeding, and the process is carried out without addition of alpha-olefin comonomer.

In another embodiment, the invention provides a process of polymerizing ethylene in a reactor, by providing a supported chromium catalyst activated at a temperature of greater than 600° C.; providing a cocatalyst selected from metal alkyls of group 13 metals, and mixtures thereof; contacting the catalyst and cocatalyst by cofeeding the catalyst and cocatalyst to the reactor or feeding the catalyst and cocatalyst separately to the reactor, to form a catalyst system; and contacting the catalyst system, under polymerization conditions, with ethylene and alpha-olefin comonomer to form polyethylene. The catalyst and cocatalyst are not contacted prior to the step of feeding or cofeeding.

In another embodiment, the invention provides a process of polymerizing ethylene in a reactor, by providing a supported chromium catalyst; providing a cocatalyst selected from metal alkyls of group 13 metals, and mixtures thereof; contacting the catalyst and cocatalyst by cofeeding the catalyst and cocatalyst to the reactor or feeding the catalyst and cocatalyst separately to the reactor, to form a catalyst system; and contacting the catalyst system, under polymerization conditions, with ethylene and alpha-olefin comonomer to form polyethylene. The catalyst and cocatalyst are not contacted prior to the step of feeding or cofeeding, and the polymerization is carried out at a temperature greater than 100° C.

In another embodiment, the invention provides a process of polymerizing ethylene in a reactor, by providing a supported chromium catalyst; providing a trialkylaluminum cocatalyst; contacting the catalyst and cocatalyst by cofeeding the catalyst and cocatalyst to the reactor or feeding the catalyst and cocatalyst separately to the reactor, to form a catalyst system; and contacting the catalyst system, under polymerization conditions, with ethylene and alpha-olefin comonomer to form polyethylene. The catalyst and cocatalyst are not contacted prior to the step of feeding or cofeeding.

In other embodiments, the invention provides polyethylene resins produced by the inventive processes, and articles formed from or including the polyethylene resins. Typical articles include, for example, containers for household industrial chemicals, drainage, pressure and conduit pipe, industrial bulk containers such as drums (typically 30 or 50 gallon drums), and geomembranes.

DETAILED DESCRIPTION

Catalyst System

The catalyst system includes a supported chromium catalyst and a cocatalyst. Supported chromium catalysts are well known, and are described, for example, in U.S. Pat. No. 2,825,721. In general, such catalysts include a chromium compound supported on an inorganic oxide matrix. Typical supports include silicon, aluminum, zirconium and thorium oxides, as well as combinations thereof. Various grades of silica and alumina support materials are widely available from numerous commercial sources.

In a particular embodiment, the support is silica. A suitable silica is a high surface area, amorphous silica, such as a material marketed under the tradenames of Davison 952 or Davison 955 by the Davison Chemical Division of W. R. Grace and Company. These silicas are in the form of spherical particles obtained by a spray-drying process, and have a surface area of about 300 $m^2/g$, and a pore volume of about 1.65 $cm^3/g$. Granular silica can also be used.

In another embodiment, the support is a silica-titania support. Silica-titania supports are well known in the art and are described, for example, in U.S. Pat. No. 3,887,494. Silica-titania supports can be produced as described in U.S. Pat. Nos. 3,887,494, 5,096,868 or 6,174,981 by "cogelling" or coprecipitating silica and a titanium compound. Such a cogel can be produced by contacting an alkali metal silicate such as sodium silicate with an acid such as sulfuric acid, hydrochloric acid or acetic acid, or an acidic salt. The titanium component can be conveniently dissolved in the acid or alkali metal silicate solution and co-precipitated with the silica. The titanium compound can be incorporated in the acid in any form in which it subsequently will be incorporated in the silica gel formed on combination of the silicate and the acid and from which form it is subsequently convertible to titanium oxide on calcination. Suitable titanium compounds include, but are not limited to, halides such as $TiCl_3$ and $TiCl_4$, nitrates, sulfates, oxalates and alkyl titanates. In instances where carbon dioxide is used as the acid, the titanium can be incorporated into the alkali metal silicate itself. When using acidic salts, the titanium compound can be incorporated in the alkali metal silicate and in such instances, convenient titanium compounds are water soluble materials which do not precipitate the silicate, i.e., are those convertible to titanium oxide on calcination such as, for example, various titanium oxalates, such as $K_2TiO(C_2O_4)_2 \cdot H_2O$, $(NH_4)_2TiO(C_2O_4)_2 \cdot H_2O$ and $Ti_2(C_2O_4)_3 \cdot H_2O$. As used herein, the term "silica-titania" support includes supports formed by any of these coprecipitation or cogel processes, or other processes by which titania and silica are both incorporated into the support.

In another embodiment, titanium is incorporated by surface-modifying a supported chromium catalyst. As used herein, the term "titanium surface-modified supported chromium catalyst" is meant to include any supported chromium catalyst that is further modified to include titanium; see, e.g., C. E. Marsden, *Plastics, Rubber and Composites Processing and Applications*, 21 (1994), 193-200. For example, it is known to modify supported chromium catalysts by slurrying the chromium catalyst in a hydrocarbon and contacting the slurry with a titanium alkoxide, $Ti(OR)_4$, and heating to form a dried, titanium surface-modified supported chromium catalyst. The alkyl group R of the alkoxide can be a $C_3$ to $C_8$ linear or branched alkyl group; a particular example of a suitable titanium alkoxide is titanium tetraisopropoxide. Another method of titanating a supported chromium catalyst is to heat a solid supported chromium catalyst and a solid titanium compound such as titanium tetraacetoacetate under gas fluidization conditions, whereby the titanium compound sublimes and titanium is deposited on the supported chromium catalyst, possibly as a titanium oxide.

The titanium compound preferably is generally present in an amount of from a lower limit of 0.5% or 1% or 2% or 3% or 5% titanium by weight to an upper limit of 12% or 10% or 8% or 6% by weight, with ranges from any lower limit to any upper limit being contemplated.

The chromium compound can be incorporated in any convenient method known in the art. For example, a chromium compound and optionally a titanium compound, is dissolved in an acidic material or the silicate and thus coprecipitated with the silica. A suitable chromium compound for this method is chromic sulfate. Another method to incorporate a chromium compound into the catalyst system is to use a hydrocarbon solution of a chromium compound convertible to chromium oxide to impregnate the support after it is spray dried or azeotrope dried (i.e., a xerogel). Exemplary of such materials are t-butyl chromate, chromium acetylacetonate, and the like. Suitable solvents include, but are not limited to, pentane, hexane, benzene, and the like. Alternatively, an aqueous solution of a chromium compound simply can be physically mixed with the support. These types of catalyst systems are disclosed in U.S. Pat. No. 3,887,494.

Chromium can be present in the catalyst an amount from a lower limit of 0.1 or 0.5 or 0.8 or 1.0% or 1.5% by weight to an upper limit of 10% or 8% or 5% or 3% % by weight, with ranges from any lower limit to any upper limit being contemplated.

Supported chromium catalysts are commercially available. Suitable commercially available chromium catalysts include HA30W and HA30LF, products of W. R. Grace & Co., containing about 1% Cr by weight.

Supported titanium-chromium catalysts are also commercially available. Suitable commercially available titanium-chromium catalysts include titanium-surface modified chromium catalysts from PQ Corporation such as C-23307, C-25305, C-25345, C-23305, and C-25307. Commercially available titanium-surface modified chromium catalysts typically contain about 1-5% Ti and 1% Cr by weight.

In any of the supports described above, the support can also include other inorganic oxides, such as alumina, thoria or zirconia. Further, the support can be treated by various methods known in the art, such as by fluoridation.

The catalyst is activated prior to use by heating the dry catalyst system in a non-reducing atmosphere, conveniently in air or in an oxygen-enriched atmosphere. The calcination temperature can be from 400 or 450 or 500 or 550° C. to 900 or 800 or 700° C., with ranges from any lower limit to any upper limit being contemplated. In a particular embodiment, the calcination temperature is greater than 600° C. Typical heating times can be for 30 minutes to 50 hours, with 2 to 20 hours being generally sufficient. Without wishing to be bound by theory, it is generally believed that the calcination procedure results in at least a substantial portion of the chromium being oxidized to a hexavalent form. Calcination is conveniently carried out in a stream of fluidizing air wherein the stream of fluidizing air is continued as the material is cooled. As a specific example, the catalyst can be placed in a cylindrical tube and fluidized in dry air at about 2 feet per minute linear velocity while being heated to a pre-determined temperature, typically 400 to 900° C., and held at temperature for about 6 hr. The activated catalyst is recovered as a free-flowing powder. Catalysts can also be activated with a sequence of gaseous compositions. For example, the catalyst can be first heated in nitrogen to a first temperature, followed by air at a second temperature, then cooled under nitrogen to ambient temperature. Activation can also involve a short period using carbon monoxide as the fluidization gas between the air and/or nitrogen steps. At the end of activation the catalyst is cooled to ambient temperature and stored under nitrogen for use in the polymerization reactor.

The catalyst is used in conjunction with a cocatalyst, as described below. In general, the cocatalyst can be a metal alkyl of a Group 13 metal. The cocatalyst can be a compound of formula $MR_3$, where M is a group 13 metal, and each R is independently a linear or branched $C_1$ or $C_2$ or $C_4$ to $C_{12}$ or $C_{10}$ or $C_8$ alkyl group. Mixtures of two or more such metal alkyls are also contemplated, and are included within the term "cocatalyst" as used herein.

In a particular embodiment, M is boron. In a specific aspect of this embodiment, each R is ethyl; i.e., the cocatalyst is triethylboron (TEB).

In another particular embodiment, M is aluminum. Particular examples of suitable cocatalysts in this embodiment are tri-isobutylaluminum (TIBAL) and tri-n-octylaluminum (TNOA).

In some embodiments, the cocatalyst can be used in an amount in accordance with (I), or (II) or both (I) and (II):

The concentration of cocatalyst in the reaction diluent is from 0.1 or 1 or 5 or 10 or 20 or 30 or 40 ppm to 100 or 90 or 80 or 70 or 60 ppm, with ranges from any lower limit to any upper limit being contemplated. The concentration of cocatalyst is expressed as parts by weight of cocatalyst per million parts by weight of the diluent phase.

The ratio of moles of cocatalyst to moles of chromium is from a lower limit of 0.1:1 or 0.5:1 or 1:1 or 2:1 or 3:1 or 4:1 to an upper limit of 10:1 or 8:1 or 7:1 or 6:1, with ranges from any lower limit to any upper limit being contemplated.

More or less cocatalyst can be used, depending upon the amount of poisons present in the reaction system. Poisons in the reactor that can consume or deactivate the cocatalyst include, for example, as oxygen, water, carbon monoxide or carbon dioxide.

In one embodiment, the catalyst system is formed in a polymerization reactor, by providing a supported chromium catalyst and a trialkylaluminum cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

In another embodiment, the catalyst system is formed in a polymerization reactor, by providing a supported chromium catalyst activated at a temperature of greater than 600° C. and a Group 13 metal alkyl cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

Polymerization Process

The methods of the invention can generally be carried out in a slurry reactor, such as a stirred slurry reactor or a slurry loop reactor, or in a gas phase reactor. For illustrative purposes, the methods are described below with particular reference to a slurry loop reactor. However, it should be appreciated that the methods are not limited to this particular reactor configuration.

A slurry loop olefin polymerization reactor can generally be described as a loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In the slurry loop olefin polymerization reactor, the polymerization medium includes monomer, optional comonomer, and a hydrocarbon solvent or diluent, advantageously aliphatic paraffin such as propane, isobutane, hexane, heptane, or cyclohexane, for example, or an aromatic diluent such as toluene, or mixtures thereof. The polymerization is carried out at a temperature of from a lower limit of 50 or 60 or 70 or 80 or 90° C. to an upper limit of 150 or 140 or 130 or 120 or 110 or 100° C., with ranges from any lower limit to any upper limit being contemplated. In a particular embodiment, the polymerization is carried out at a temperature of greater than 95° C. or greater than 100° C. In another particular embodiment, the polymerization is carried out at a temperature $T_R$ of from greater than 100° C. to 110° C. (i.e., 100° C.<$T_R$≦110° C.). Pressures can vary from about 100 to about 700 psia (0.69-4.8 MPa). Additional description is given in U.S. Pat. Nos. 5,274,056 and 4,182,810 and PCT publication WO 94/21962. As such, the reactor constituents generally are a combination of both solids, such as supported catalyst and polymerized olefin, and liquids, such as those described above. The percentage of solids within the reactor constituents may be as high as 60 wt % of the reactor constituents. Typically, the weight percent of solids is in the range of 45 to 55 wt %.

The slurry loop olefin polymerization reactor may be operated in a single stage process or in multistage processes. In multistage processing, the polymerization of olefins is carried out in two or more reactors. These reactors can be configured in series, in parallel, or a combination thereof.

The methods of the invention are used in the slurry polymerization of ethylene to form polyethylene homopolymer or copolymer having the properties described herein. In some embodiments, the methods are carried out without addition of comonomer; i.e., the monomer feed is essentially ethylene, with no comonomer intentionally added, although it should be appreciated that minor amounts of other polymerizable olefins may be present in the ethylene feedstock, typically less than 1% or less than 0.5% or less than 0.1% or less than 0.05% or less than 0.01% by weight. Without wishing to be bound by theory, it is believed that processes of the invention result in formation in situ of polymerizable comonomer, which is then incorporated into the polyethylene. Thus, polyethylenes formed in processes of the invention even without addition of comonomer can have short chain branching and other properties typically associated with polyethylene copolymers.

In some embodiments, both ethylene and at least one comonomer are provided to the reactor. Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include conjugated and non-conjugated dienes, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the polyolefin and the specific comonomers selected. One skilled in the art can readily determine the appropriate comonomer content appropriate to produce a polyolefin having a desired density. As used herein, the term "comonomer" includes mixtures of two or more comonomers.

The catalyst and cocatalyst can be fed separately into the slurry reactor, such as through separate inlets or sequentially through a common inlet, or can be co-fed. As used herein, the term "co-fed" means that catalyst and cocatalyst feedstreams are combined and fed together into the reactor. This cofeeding or combining of feedstreams, is different from the pre-contacting required in the prior art, such as in EP 1 172 381, wherein a supported chromium catalyst is treated with trialkylaluminum cocatalyst and dried to produce a dry catalyst of fixed Al:Cr ratio, prior to introducing the catalyst to a polymerization reactor. Processes of the invention advantageously eliminate the need for such pre-contacting steps.

In one embodiment, the invention provides a process of polymerizing ethylene in a slurry reactor, by providing a supported chromium catalyst; providing a cocatalyst selected from metal alkyls of group 13 metals; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene to form polyethylene. The catalyst and cocatalyst are not contacted prior to the step of feeding or cofeeding, and the process is carried out without addition of alpha-olefin comonomer.

In another embodiment, the invention provides a process of polymerizing ethylene in a slurry reactor, by providing a supported chromium catalyst activated at a temperature of greater than 600° C.; providing a cocatalyst selected from metal alkyls of group 13 metals; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding.

In another embodiment, the invention provides a process of polymerizing ethylene in a slurry reactor, by providing a supported chromium catalyst; providing a cocatalyst selected from metal alkyls of group 13 metals; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding, and the polymerization is carried out at a temperature greater than 100° C.

In another embodiment, the invention provides a process of polymerizing ethylene in a slurry reactor, by providing a supported chromium catalyst; providing a trialkylaluminum cocatalyst; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding.

In some embodiments, ethylene is polymerized without intentional addition of comonomer. Although not wishing to be bound by theory, it is believed that polymerization of ethylene in the presence of a supported chromium catalyst and a cocatalyst generates alpha-olefins as a polymerization by-product. The in situ generated alpha-olefin can copolymerize with the ethylene to produce polyethylene copolymer with short chain branching, without addition of comonomer. The short chain branching decreases polymer density. Increasing the concentration of cocatalyst in the reactor increases the amount of in situ comonomer generation, which improves the ESCR and decreases polymer density. It is believed that the in situ alpha-olefins produced are short chain alpha-olefins such as butene, hexene, octene and decene, and these comonomers are believed to provide short chain branches in the copolymer of varying lengths and more evenly distributed in the polymer chain than separately added comonomer. As a result, it is believed that in-situ generated comonomer is more effective at improving polymer ESCR than equivalent quantities of added comonomer, for a given polymer density.

In any of the embodiments described herein, hydrogen can be used if desired to control the molecular weight, as is well known in the art.

Product

The polyethylene produced in the methods of the invention shows improved properties such as environmental stress crack resistance (ESCR). ESCR is a measure of a polyethylene's resistance to cracking under stress and in the presence of an organic reagent such as a surfactant. ESCR is determined in accordance with ASTM D 1693, condition B, 10% IGEPAL™.

In various embodiments, the polyethylene product has one or more of the following properties:

an ESCR of at least 50 hr or at least 100 hr or at least 500 hr or at least 750 hr or at least 1000 hr;

a notched constant tensile load (NCTL) of at least 10 hr or at least 15 hr or at least 25 hr or at least 50 hr;

a high load melt index ($I_{21.6}$) of from a lower limit of 0.1 or 0.5 or 1 or 10 or 20 or 30 or 40 g/10 min to an upper limit of 100 or 80 or 60, with ranges from any lower limit to any upper limit being contemplated;

a melt index ($I_{2.16}$) of from a lower limit of 0.01 or 0.1 or 0.5 or 1 or 10 or 20 or 30 or 40 g/10 min to an upper limit of 100 or 80 or 60, with ranges from any lower limit to any upper limit being contemplated; and a density of from a lower limit of 0.935 or 0.940 or 0.945 or 0.950 g/cm$^3$ to an upper limit of 0.960 or 0.955 g/cm$^3$, with ranges from any lower limit to any upper limit being contemplated.

Advantageously, the methods of the present invention can be used to produce polyethylene having consistent ESCR and density.

EXAMPLES

Environmental Stress Crack Resistance (ESCR) (bent strip) was determined in accordance with ASTM D 1693, condition B, 10% IGEPAL™. IGEPAL™ is a nonylphenoxy poly(ethylenoxy)ethanol surfactant available from Rhone Polenc, Cranbury, N.J. All ESCR values cited herein are ASTM D 1693 condition B, 10% IGEPAL™ F50 values, and are given in units of hours.

Notched Constant Tensile Load (NCTL) is a stress crack resistance test for highway drainage pipe, and was measured in accordance with ASTM D-5397-99, using a yield stress of 4000 psi (15% load stress of 600 psi). Each reported value is the average hours to break of five samples.

Polymer density (g/cm$^3$) is determined using a compression molded sample, cooled at 15° C. per hour and conditioned for 40 hours at room temperature according to ASTM D1505-68 and ASTM D1928, procedure C.

Polymer melt flow rates can be determined at 190° C. according to ASTM D-1238-57T. $I_{21.6}$ is the "flow index" or melt flow rate of the polymer measured according to ASTM D-1238-57T, condition F, and $I_{2.16}$ is the "melt index" or melt flow rate of the polymer measured according to ASTM D-1238-57T, condition E. The ratio of $I_{21.6}$ to $I_{2.16}$ is the "melt flow ratio" or "MFR". The melt flow rate $I_{21.6}$ is also sometimes termed the "high load melt index" or HLMI. Melt flow rates are reported in units of grams per 10 minutes (g/10 min) or equivalently decigrams per minute (dg/min).

Several commercially available supported chromium catalysts were used. HA30W and HA30LF are products of W. R. Grace & Co. containing about 1% Cr by weight.

C-23307, C-25305, C-25307 are titanium-surface modified chromium catalysts available from PQ Corp.

In the following examples, polymerizations were conducted in a six-liter autoclave equipped with a mechanical overhead stirrer and an external jacket for regulating temperature. In each case, the polymerization was performed by providing continuous addition of ethylene at a fixed total pressure. The reactor had thermocouples to control the temperature of the external jacket and the internal temperature of the reactor during the polymerization. Ethylene fed to the reactor was passed through an electronic gas flow meter to permit continuous monitoring of the ethylene flow to the reactor. All handling of the polymerization reaction components was carried out using airless techniques to exclude oxygen and water. The polymerization was conducted in a slurry of isobutane that had been dried and deoxygenated. All runs were conducted at a reactor temperature between 215° F. and 226° F. (102 to 108° C.) with 180 psi ethylene for a total reactor pressure of 460 to 500 psig (3.2 to 3.5 MPa). Copolymers of ethylene and 1-hexene were made in some cases, as indicated in the data tables. In each run, the catalyst was first added to the reactor as a dry powder, then cocatalyst added as a solution either in a hydrocarbon solvent, or in the comonomer in the case of copolymerizations, then isobutane diluent added. Upon completion of the polymerization test run (normally 45 to 60 minutes) the reactor was vented to the atmosphere to remove isobutane and unreacted ethylene. The remaining particle form polymer was dried with a nitrogen gas flow at 160° F. (71° C.) for 20 minutes. Finally, the reactor was cooled and the dry polyethylene powder recovered.

In the data tables, the following abbreviations are used:

TIBAL=tri-isobutylaluminum

TNOA=tri-n-octylaluminum.

In Examples 1-56, no comonomer is added. In the remaining examples unless otherwise indicated, hexene was used as comonomer in the indicated amount (cm$^3$). In Examples 57-76, the catalyst activation temperature was 815° C. and the reaction temperature was 105° C.

TABLE 1

| | Catalyst | | Cocatalyst | | | | | Powder | | | Plaque | | |
|---|---|---|---|---|---|---|---|---|---|---|---|---|---|
| Ex. | Type | $T_A^*$ (° C.) | Type | mmol | mol ratio Al:Cr | $T_R^{**}$ (° C.) | Activity (g/g hr) | MI (dg/min) | HLMI (dg/min) | Density (g/cm$^3$) | HLMI (dg/min) | Density (g/cm$^3$) | ESCR (hr) |
| 1 | HA30W | 480 | TIBAL | 0.26 | 4.5 | 107 | 2138 | 0.03 | 4 | 0.9498 | | | |
| 2 | HA30W | 480 | TIBAL | 0.26 | 4.5 | 107 | 1491 | 0.03 | 3.7 | 0.9450 | | | |
| 3 | HA30W | 480 | TIBAL | 0.13 | 2.25 | 107 | 1632 | 0.02 | 4.3 | 0.9558 | | | |
| 4 | C25305 | 480 | TIBAL | 0.26 | 4.5 | 107 | 1107 | 0.07 | 7.7 | 0.9569 | 7.5 | 0.9597 | 380 |
| 5 | C25305 | 480 | TIBAL | 0.26 | 4.5 | 107 | 2224 | 0.07 | 7.5 | 0.9535 | 8.3 | 0.9553 | >1000 |
| 6 | C25305 | 480 | TIBAL | 0.13 | 2.25 | 107 | 1965 | 0.08 | 8.6 | 0.9551 | 10.2 | 0.9573 | 565 |
| 7 | C25305 | 590 | TIBAL | 0.26 | 4.5 | 105 | 3372 | 0.21 | 15.9 | 0.9577 | | | |
| 8 | C25305 | 590 | TIBAL | 0.26 | 4.5 | 105 | 3455 | 0.25 | 17.9 | 0.9480 | | | |
| 9 | C25305 | 590 | TIBAL | 0.13 | 2.25 | 105 | 1400 | 0.13 | 11.9 | 0.9606 | | | |
| 10 | C25305 | 590 | TIBAL | 0.26 | 4.5 | 103 | 4458 | 0.15 | 11.8 | 0.9469 | 7.2 | 0.9503 | 562 |
| 11 | C25305 | 590 | TIBAL | 0.26 | 4.5 | 103 | 3686 | 0.14 | 14.1 | 0.9496 | 8.8 | 0.9510 | >1000 |

TABLE 1-continued

| | Catalyst | | Cocatalyst | | | | | Powder | | | Plaque | | |
|---|---|---|---|---|---|---|---|---|---|---|---|---|---|
| Ex. | Type | $T_A^*$ (°C.) | Type | mmol | mol ratio Al:Cr | $T_R^{**}$ (°C.) | Activity (g/g hr) | MI (dg/min) | HLMI (dg/min) | Density (g/cm³) | HLMI (dg/min) | Density (g/cm³) | ESCR (hr) |
| 12 | C25305 | 590 | TIBAL | 0.13 | 2.25 | 103 | 3541 | 0.17 | 13.8 | 0.9539 | 10.1 | 0.9555 | 310 |
| 13 | C25305 | 590 | TNOA | 0.26 | 4.3 | 102 | 4642 | 0.07 | 8.1 | 0.9511 | 7.4 | 0.9534 | >1000 |
| 14 | C25305 | 590 | TNOA | 0.26 | 4.3 | 102 | 4000 | 0.1 | 11.2 | 0.9497 | 6.8 | 0.9523 | >1000 |
| 15 | C25305 | 590 | TNOA | 0.26 | 5.4 | 107 | 4542 | 0.18 | 11 | 0.9475 | 9.7 | 0.9499 | 884 |
| 16 | C25305 | 590 | TNOA | 0.26 | 5.3 | 107 | 3926 | 0.18 | 13.4 | 0.9458 | | | |
| 17 | C25305 | 590 | TNOA | 0.13 | 2.1 | 107 | 4042 | 0.21 | 14.6 | 0.9548 | 11.1 | 0.9561 | 211 |
| 18 | C25307 | 480 | TIBAL | 0.26 | 4.5 | 107 | 2261 | 0.08 | 9.0 | 0.9535 | 8.3 | 0.9571 | >1000 |
| 19 | C25307 | 480 | TIBAL | 0.26 | 4.5 | 107 | 2202 | 0.08 | 8.9 | 0.9538 | 9.8 | 0.9565 | 768 |
| 20 | C25307 | 480 | TIBAL | 0.13 | 2.25 | 107 | 1892 | 0.17 | 17.5 | 0.9604 | | | |
| 21 | C25307 | 590 | TIBAL | 0.26 | 4.5 | 105 | 2602 | 0.19 | 15.6 | 0.9491 | | | |
| 22 | C25307 | 590 | TIBAL | 0.26 | 4.5 | 105 | 2926 | 0.16 | 13.2 | 0.9507 | 10.6 | 0.9514 | >1000 |
| 23 | C25307 | 590 | TIBAL | 0.13 | 2.25 | 105 | 3163 | 0.17 | 13.7 | 0.9539 | 10.4 | 0.9559 | 593 |
| 24 | C25307 | 590 | TIBAL | 0.26 | 4.5 | 103 | 2309 | 0.17 | 13.4 | 0.9520 | 8.9 | 0.9535 | >1000 |
| 25 | C25307 | 590 | TIBAL | 0.26 | 4.5 | 103 | 2847 | 0.11 | 10.7 | 0.9542 | 9.1 | 0.9468 | >1000 |
| 26 | C25307 | 590 | TNOA | 0.13 | 2.5 | 107 | 2437 | 0.16 | 16.8 | 0.9611 | | | |
| 27 | C25307 | 590 | TNOA | 0.13 | 2.8 | 107 | 2541 | 0.19 | 16.1 | 0.9597 | | | |
| 28 | C25307 | 590 | TNOA | 0.065 | 1.5 | 107 | 2195 | 0.17 | 15.1 | 0.9614 | | | |

*Catalyst activation temperature
**Reaction temperature

TABLE 2

| | Catalyst | | Cocatalyst | | | | | Powder | | | Plaque | | | |
|---|---|---|---|---|---|---|---|---|---|---|---|---|---|---|
| Ex. | Type | $T_A^*$ (°C.) | Type | mmol | mol ratio Al:Cr | $T_R^{**}$ (°C.) | Activity (g/g hr) | MI (dg/min) | HLMI (dg/min) | Density (g/cm³) | MI (dg/min) | HLMI (dg/min) | Density (g/cm³) | NCTL (hr) |
| 29 | C23307 | 590 | TIBAL | 0.26 | 4.5 | 105 | 2740 | 0.15 | 15.3 | 0.9508 | | | | |
| 30 | C23307 | 590 | TIBAL | 0.26 | 4.5 | 105 | 2546 | 0.13 | 16.2 | 0.9494 | | | | |
| 31 | C23307 | 590 | TIBAL | 0.13 | 2.25 | 105 | 3361 | 0.22 | 18.8 | 0.9565 | | | | |
| 32 | C23307 | 590 | TIBAL | 0.26 | 4.5 | 107 | 2464 | 0.27 | 23.7 | 0.9502 | 0.07 | 13.3 | 0.9529 | 91.5 |
| 33 | C25305 | 590 | TIBAL | 0.26 | 4.5 | 107 | 2924 | 0.12 | 13.8 | 0.9494 | | | | |
| 34 | C25305 | 590 | TIBAL | 0.26 | 4.5 | 107 | 3617 | 0.20 | 15.0 | 0.9459 | | | | |
| 35 | C25305 | 590 | TIBAL | 0.13 | 2.25 | 107 | 4456 | 0.19 | 16.3 | 0.9494 | | | | |
| 36 | C25305 | 590 | TNOA | 0.26 | 4.4 | 105 | 2995 | 0.24 | 20.2 | 0.9520 | 0.09 | 12.6 | 0.9537 | 88.4 |
| 37 | C25307 | 590 | TIBAL | 0.26 | 4.5 | 107 | 2286 | 0.23 | 18.8 | 0.9494 | 0.11 | 12.9 | 0.9521 | 83.6 |
| 38 | C25307 | 590 | TIBAL | 0.26 | 4.5 | 107 | 2717 | 0.21 | 16.5 | 0.9485 | | | | |
| 39 | C25307 | 590 | TIBAL | 0.13 | 2.25 | 107 | 3187 | 0.26 | 19.8 | 0.9496 | 0.12 | 14.5 | 0.9526 | 145.3 |
| 40 | C25307 | 590 | TIBAL | 0.26 | 4.5 | 107 | 2624 | 0.25 | 21.5 | 0.9502 | 0.10 | 14.6 | 0.9519 | 93.3 |
| 41 | C25307 | 590 | TIBAL | 0.13 | 2.25 | 107 | 3046 | 0.29 | 22.0 | 0.9531 | 0.14 | 18.3 | 0.9551 | 48.5 |

*Catalyst activation temperature
**Reaction temperature

TABLE 3

C25307 Catalyst, with 0.2 cm³ 1-hexene comonomer

| | | Cocatalyst | | | | | Powder | | | Plaque | | |
|---|---|---|---|---|---|---|---|---|---|---|---|---|
| Ex | $T_A^*$ (°C.) | Type | mol ratio Al:Cr | $T_R^{**}$ (°C.) | Induction time (min) | Activity (g/g hr) | MI (dg/min) | HLMI (dg/min) | Density (g/cm³) | HLMI (dg/min) | Density (g/cm³) | ESCR (hr) |
| 42 | 540 | TIBAL | 1 | 107 | 8 | 1704 | 0.12 | 13.67 | 0.9612 | 12.4 | 0.9631 | 150 |
| 43 | 540 | TIBAL | 1 | 107 | 15 | 833 | 0.16 | 19.26 | 0.9635 | 15.8 | 0.9645 | |
| 44 | 650 | TNOA | 4 | 103 | 2 | 4280 | 0.10 | 8.76 | 0.9491 | 5.6 | 0.9501 | >1000 |
| 45 | 650 | TNOA | 4 | 103 | 1 | 3660 | 0.10 | 8.41 | 0.9515 | 5.9 | 0.9530 | 592 |
| 46 | 650 | TIBAL | 4 | 107 | 1 | 3130 | 0.28 | 19.09 | 0.9446 | 15.1 | 0.9470 | >1000 |
| 47 | 650 | TIBAL | 4 | 107 | 3 | 3410 | 0.25 | 16.79 | 0.9446 | 13.6 | 0.9475 | >1000 |
| 48 | 540 | TNOA | 4 | 107 | 1 | 2196 | 0.07 | 5.61 | 0.9557 | 5.4 | 0.9566 | >1000 |
| 49 | 540 | TNOA | 4 | 107 | 1 | 2327 | 0.04 | 4.86 | 0.9555 | 5.0 | 0.9567 | >1000 |
| 50 | 650 | TIBAL | 1 | 103 | 12 | 2120 | 0.25 | 17.76 | 0.9604 | 13.7 | 0.9612 | 90 |
| 51 | 650 | TIBAL | 1 | 103 | 5 | 2751 | 0.22 | 17.55 | 0.9582 | 11.1 | 0.9589 | 136 |
| 52 | 540 | TIBAL | 4 | 103 | 3 | 1767 | 0.04 | 4.62 | 0.955 | 4.7 | 0.9566 | >1000 |
| 53 | 540 | TIBAL | 4 | 103 | 3 | 2119 | 0.03 | 4.55 | 0.9565 | 4.5 | 0.9573 | >1000 |
| 54 | 650 | TNOA | 1 | 107 | 25 | 1212 | 0.32 | 20.45 | 0.9599 | 14.9 | 0.9620 | |
| 55 | 650 | TNOA | 1 | 107 | 17 | 2125 | 0.21 | 15.79 | 0.9599 | 13.1 | 0.9614 | |
| 56 | 540 | TNOA | 1 | 103 | 17 | 967 | 0.11 | 13.51 | 0.9629 | 11.1 | 0.9640 | |

*Catalyst activation temperature
**Reaction temperature

TABLE 4

HA30LF Catalyst; TIBAL cocatalyst

| | | | | | | Powder | | Plaque | | | |
|---|---|---|---|---|---|---|---|---|---|---|---|
| Ex | mol ratio Al:Cr | Hexene (cm³) | Residence Time (min) | Induction Time (min) | Activity (g/g hr) | MI (dg/min) | HLMI (dg/min) | MI (dg/min) | HLMI (dg/min) | Density (g/cm³) | NCTL (hr) |
| 57 | 1 | 0 | 40 | 10 | 2657 | 0.35 | 28.5 | 0.14 | 17.1 | 0.9629 | 6.4 |
| 58 | 1 | 1 | 40 | 1 | 3424 | 0.37 | 32.9 | 0.1 | 15.4 | 0.9588 | 9.8 |
| 59 | 3 | 0 | 40 | 5 | 4365 | 0.43 | 37 | 0.1 | 18.3 | 0.9449 | 39.8 |
| 60 | 3 | 1 | 40 | 3 | 3049 | 0.71 | 58.5 | 0.12 | 20.3 | 0.9431 | 24.5 |
| 61 | 1 | 0 | 60 | 20 | 3041 | 0.2 | 18.8 | 0.11 | 10.9 | 0.9626 | 12.1 |
| 62 | 1 | 1 | 60 | 10 | 3458 | 0.21 | 22.4 | 0.1 | 9.2 | 0.9595 | 9.1 |
| 63 | 3 | 0 | 60 | 2 | 4339 | 0.35 | 27.3 | 0.13 | 15.8 | 0.9459 | 23.1 |
| 64 | 3 | 1 | 60 | 2 | 3024 | 0.28 | 24.2 | 0.07 | 12.2 | 0.945 | 54.2 |
| 65 | 1 | 0 | 40 | 5 | 2897 | 0.23 | 23.1 | 0.08 | 12 | 0.9626 | 7.5 |
| 66 | 1 | 1 | 40 | 2 | 3563 | 0.24 | 26.5 | 0.11 | 12.1 | 0.9619 | 7.5 |
| 67 | 3 | 0 | 40 | 1 | 4336 | 0.42 | 33.9 | 0.17 | 20.4 | 0.9466 | 18.2 |
| 68 | 3 | 1 | 40 | 5 | 2379 | 0.73 | 59.7 | 0.13 | 22.8 | 0.9447 | 21.9 |
| 69 | 1 | 0 | 60 | 4 | 3477 | 0.22 | 21.2 | 0.08 | 12 | 0.9618 | 6.3 |
| 70 | 1 | 1 | 60 | 3 | 3079 | 0.25 | 26.8 | 0.07 | 15.1 | 0.9600 | 8.4 |
| 71 | 3 | 0 | 60 | 2 | 4532 | 0.32 | 22.7 | 0.05 | 9.9 | 0.9475 | 40.0 |
| 72 | 3 | 1 | 60 | 4 | 2543 | 0.33 | 32.2 | 0.11 | 16.4 | 0.9489 | 54.8 |
| 73 | 2 | 0.5 | 50 | 2 | 4052 | 0.38 | 33.9 | 0.11 | 14.4 | 0.9571 | 11.3 |
| 74 | 2 | 0.5 | 50 | 3 | 4718 | 0.38 | 30.2 | 0.08 | 13 | 0.9492 | 15.7 |
| 75 | 2 | 0.5 | 50 | 2 | 4171 | 0.33 | 28.3 | 0.09 | 13.8 | 0.9494 | 20.3 |
| 76 | 2 | 0.5 | 50 | 4 | 4325 | 0.37 | 31.7 | 0.08 | 15.6 | 0.9479 | 36.4 |

All patents, test procedures, and other documents cited herein, including priority documents, are fully incorporated by reference to the extent such disclosure is not inconsistent with this invention and for all jurisdictions in which such incorporation is permitted.

Having thus described the invention in detail, the following sets forth, without limitation, particular preferred embodiments:

a method of forming a catalyst system in a polymerization reactor, the method comprising: (a) providing a supported chromium catalyst; (b) providing a trialkylaluminum cocatalyst of formula $AlR_3$, where each R group is independently a linear or branched $C_4$-$C_{12}$ alkyl group; and (c) contacting the catalyst and cocatalyst by: (i) cofeeding the catalyst and cocatalyst to the reactor, wherein the catalyst and cocatalyst are not contacted prior to the step of cofeeding, or (ii) feeding the catalyst and cocatalyst separately to the reactor, wherein the catalyst and cocatalyst are not contacted prior to the step of feeding, to form a catalyst system;

including one or more of the following more preferred embodiments: wherein the supported chromium catalyst comprises chromium supported on a silica-titania support; wherein the supported chromium catalyst comprises titanium surface-modified supported chromium catalyst; wherein each R is independently a linear or branched $C_4$ to $C_8$ alkyl group; wherein the cocatalyst comprises tri-isobutylaluminum or tri-n-octylaluminum; wherein the polymerization reactor is a slurry reactor; wherein the supported chromium catalyst is activated by heating to a temperature of from 400° C. to 900° C.; wherein the supported chromium catalyst is activated by heating to a temperature greater than 600° C.;

and also a catalyst system formed by the foregoing;

and a process of polymerizing ethylene comprising contacting, under polymerization conditions, ethylene and the catalyst system according to the present invention;

and a process of polymerizing ethylene comprising contacting, under polymerization conditions, ethylene, alpha-olefin comonomer, and the catalyst system according to the present invention;

and a polyethylene resin formed by the processes of polymerizing ethylene using the catalyst according to the present invention;

and an article comprising the polyethylene resin made by a process according to the present invention.

Another particularly preferred embodiment is a process of polymerizing ethylene in a polymerization reactor, the process comprising: (a) providing a supported chromium catalyst; (b) providing a cocatalyst selected from metal alkyls of group 13 metals; (c) contacting the catalyst and cocatalyst by: (i) cofeeding the catalyst and cocatalyst to the reactor, wherein the catalyst and cocatalyst are not contacted prior to the step of cofeeding, or (ii) feeding the catalyst and cocatalyst separately to the reactor, wherein the catalyst and cocatalyst are not contacted prior to the step of feeding, to form a catalyst system; and (d) contacting the catalyst system, under polymerization conditions, with ethylene, wherein the process is carried out without addition of alpha-olefin comonomer;

and including one or more of the following more preferred embodiments:

wherein the supported chromium catalyst comprises chromium supported on a silica-titania support; wherein the supported chromium catalyst comprises titanium surface-modified supported chromium catalyst; wherein the cocatalyst comprises a compound of formula $MR_3$, where M is a Group 13 metal, and each R is independently a linear or branched $C_1$ to $C_{12}$ alkyl group; wherein each R is independently a linear or branched $C_2$ to $C_{10}$ alkyl group; wherein each R is independently a linear or branched $C_4$ to $C_8$ alkyl group; wherein M is boron; wherein each R is ethyl; wherein M is aluminum; wherein each R is independently a $C_4$ to $C_{12}$ alkyl group; wherein the cocatalyst comprises tri-isobutylaluminum or tri-n-octylaluminum; wherein the polymerization is carried out at a temperature of from 80° C. to 120° C.; wherein the polymerization is carried out at a temperature greater than 100° C.; wherein the polymerization is carried out at a temperature of from greater than 100° C. to 110° C.; wherein the catalyst is activated by heating to a temperature of from 400°

C. to 900° C.; wherein the catalyst is activated by heating to a temperature greater than 600° C.; wherein the polymerization reactor is a slurry reactor;

and also a polyethylene resin formed by and of the foregoing processes;

and also an article comprising the polyethylene resin made by a process according to the present invention.

Yet another particularly preferred embodiment is:

a process of polymerizing ethylene in a polymerization reactor, the process comprising: (a) providing a supported chromium catalyst activated at a temperature of greater than 600° C.; (b) providing a cocatalyst selected from metal alkyls of group 13 metals; (c) contacting the catalyst and cocatalyst by: (i) cofeeding the catalyst and cocatalyst to the reactor, wherein the catalyst and cocatalyst are not contacted prior to the step of cofeeding, or (ii) feeding the catalyst and cocatalyst separately to the reactor, wherein the catalyst and cocatalyst are not contacted prior to the step of feeding, to form a catalyst system; and (d) contacting the catalyst system, under polymerization conditions, with monomers comprising ethylene and alpha-olefin comonomer;

and a particularly preferred embodiment of polymerizing ethylene in a polymerization reactor, the process comprising: (a) providing a supported chromium catalyst; (b) providing a cocatalyst selected from metal alkyls of group 13 metals; (c) contacting the catalyst and cocatalyst by: (i) cofeeding the catalyst and cocatalyst to the reactor, wherein the catalyst and cocatalyst are not contacted prior to the step of cofeeding, or (ii) feeding the catalyst and cocatalyst separately to the reactor, wherein the catalyst and cocatalyst are not contacted prior to the step of feeding, to form a catalyst system; and (d) contacting the catalyst system, under polymerization conditions, with monomers comprising ethylene and alpha-olefin comonomer, wherein the polymerization is carried out at a temperature greater than 100° C.;

and wherein either of the two immediately foregoing particularly preferred embodiments including one or more of the following more preferred embodiments: wherein the supported chromium catalyst comprises chromium supported on a silica-titania support; wherein the supported chromium catalyst comprises titanium surface-modified supported chromium catalyst; wherein the cocatalyst comprises a compound of formula $MR_3$, where M is a Group 13 metal, and each R is independently a linear or branched $C_1$ to $C_{12}$ alkyl group; wherein each R is independently a linear or branched $C_4$ to $C_8$ alkyl group; wherein M is boron; wherein each R is ethyl; wherein M is aluminum; wherein each R is independently a $C_4$ to $C_{12}$ alkyl group; wherein the cocatalyst comprises tri-isobutylaluminum or tri-n-octylaluminum; wherein the polymerization is carried out at a temperature of from 80° C. to 120° C.; wherein the polymerization is carried out at a temperature greater than 100° C.; wherein the polymerization is carried out at a temperature of from greater than 100° C. to 110° C.; wherein the catalyst is activated by heating to a temperature of from 400° C. to 900° C.; wherein the catalyst is activated by heating to a temperature greater than 600° C.; wherein the polymerization reactor is a slurry reactor;

and also the polyethylene resin formed by the foregoing;

and also an article comprising the polyethylene resin made by the foregoing processes.

Moreover, another particularly preferred embodiment of the present invention is a process of polymerizing ethylene in a polymerization reactor, the process comprising: (a) providing a supported chromium catalyst; (b) providing a trialkylaluminum cocatalyst of formula $AlR_3$, where each R group is independently a linear or branched $C_4$-$C_{12}$ alkyl group; (c) contacting the catalyst and cocatalyst by: (i) cofeeding the catalyst and cocatalyst to the reactor, wherein the catalyst and cocatalyst are not contacted prior to the step of cofeeding, or (ii) feeding the catalyst and cocatalyst separately to the reactor, wherein the catalyst and cocatalyst are not contacted prior to the step of feeding, to form a catalyst system; and (d) contacting the catalyst system, under slurry polymerization conditions, with monomers comprising ethylene and alpha-olefin comonomer;

including one or more of the following preferred embodiments: wherein the supported chromium catalyst comprises chromium supported on a silica-titania support; wherein the supported chromium catalyst comprises titanium surface-modified supported chromium catalyst; wherein each R is independently a linear or branched $C_4$ to $C_8$ alkyl group; wherein the cocatalyst comprises tri-isobutylaluminum or tri-n-octylaluminum; wherein the polymerization is carried out at a temperature of from 80° C. to 120° C.; wherein the polymerization is carried out at a temperature greater than 100° C.; wherein the polymerization is carried out at a temperature of from greater than 100° C. to 110° C.; wherein the catalyst is activated by heating to a temperature of from 400° C. to 900° C.; wherein the catalyst is activated by heating to a temperature greater than 600° C.; wherein the polymerization reactor is a slurry reactor;

and also a polyethylene resin formed by the foregoing;

and an article comprising the polyethylene resin formed by the foregoing.

What is claimed is:

1. A process of polymerizing ethylene in a slurry polymerization reactor, the process comprising:
   (a) providing a supported chromium catalyst comprising:
      (i) chromium supported on a silica-titania support, or
      (ii) titanium surface-modified supported chromium catalyst;
   (b) providing a trialkylaluminum cocatalyst of formula $AlR_3$, where each R group is independently a linear or branched $C_4$-$C_{12}$ alkyl group;
   (c) contacting the catalyst and cocatalyst to form a catalyst system wherein the ratio of moles of cocatalyst to moles of chromium in the catalyst is in the range of 3:1 to 8:1 by:
      (i) cofeeding the catalyst and cocatalyst to a polymerization reactor, wherein the catalyst and cocatalyst are not contacted prior to the step of cofeeding, or
      (ii) feeding the catalyst and cocatalyst separately to the polymerization reactor, wherein the catalyst and cocatalyst are not contacted prior to the step of feeding,
   (d) contacting the catalyst system with a monomer feed consisting essentially of liquid phase ethylene, wherein the reactor is operated at a temperature and pressure sufficient to polymerize ethylene in a slurry phase; and
   (e) recovering a polymer having an ESCR of at least 500 hours according to ASTM D 1693, Condition B.

2. The process of claim 1, wherein each R is independently a linear or branched $C_4$ to $C_8$ alkyl group.

3. The process of claim 1, wherein the cocatalyst comprises tri-isobutylaluminum or tri-n-octylaluminum.

4. The process of claim 1, wherein the polymerization is carried out at a temperature of from 80° C. to 120° C.

5. The process of claim 1, wherein the polymerization is carried out at a temperature of from 100° C. to 900° C.

6. The process of claim 1, wherein the polymerization is carried out at a temperature of from greater than 100° C. to 110° C.

7. The process of claim 1, wherein the catalyst is activated by heating to a temperature of from 400° C. to 900° C.

8. The process of claim 1, wherein the catalyst is activated by heating to a temperature of from 600° C. to 900° C.

9. The process of claim 1 wherein said polymer has an ESCR greater than 750 hours.

10. The process of claim 9 wherein said polymer has an ESCR greater than 1000 hours.

11. A process of polymerizing ethylene in a slurry polymerization reactor, the process comprising:
(a) providing a supported chromium catalyst comprising:
  (i) chromium supported on a silica-titania support, or
  (ii) titanium surface-modified supported chromium catalyst;
(b) providing a trialkylaluminum cocatalyst of formula $AlR_3$, where each R group is independently a linear or branched $C_4$-$C_{12}$ alkyl group; and
(c) contacting the catalyst and cocatalyst to form a catalyst system wherein the ratio of moles of cocatalyst to moles of chromium in the catalyst is in the range of 3:1 to 8:1 by:
  (i) cofeeding the catalyst and cocatalyst to a reactor, wherein the catalyst and cocatalyst are not contacted prior to the step of cofeeding, or
  (ii) feeding the catalyst and cocatalyst separately to the reactor, wherein the catalyst and cocatalyst are not contacted prior to the step of feeding; and
(d) polymerizing liquid phase ethylene in the presence of the catalyst system within the reactor to provide an ethylene polymer;
  wherein the reactor is a loop reactor comprising liquid phase ethylene and a liquid phase diluent,
  wherein the reactor is operated at a temperature of about 50° C. to about 150° C., and a pressure of about 0.69 MPa to about 4.8 MPa; and
  wherein the density of the ethylene polymer produced is less than 0.955 $g/cm^3$.

12. The method of claim 11, wherein each R is independently a linear or branched $C_4$ to $C_8$ alkyl group.

13. The method of claim 11, wherein the cocatalyst comprises tri-isobutylaluminum or tri-n-octylaluminum.

14. The method of claim 1, wherein the supported chromium catalyst is activated by heating to a temperature of from 400° C. to 900° C.

15. The method of claim 11, wherein the supported chromium catalyst is activated by heating to a temperature of from 600° C. to 900° C.

16. The method of claim 11, wherein the reactor comprises a loop-shaped, continuous tube.

* * * * *

UNITED STATES PATENT AND TRADEMARK OFFICE
CERTIFICATE OF CORRECTION

PATENT NO. : 7,632,901 B2  Page 1 of 1
APPLICATION NO. : 10/456604
DATED : December 15, 2009
INVENTOR(S) : Katzen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Second Day of November, 2010

David J. Kappos
*Director of the United States Patent and Trademark Office*